United States Patent [19]

Pao

[11] 3,761,898

[45] Sept. 25, 1973

[54] RANDOM ACCESS MEMORY

[75] Inventor: Henry C. Pao, Waltham, Mass.

[73] Assignee: Raytheon Company, Lexington, Mass.

[22] Filed: Mar. 5, 1971

[21] Appl. No.: 121,377

[52] U.S. Cl. ........ 340/173 R, 340/173 FF, 307/238, 307/279

[51] Int. Cl. .......... G11c 11/40

[58] Field of Search .......... 340/173 R, 173 FF; 307/238, 279

[56] References Cited

UNITED STATES PATENTS

| | | | |
|---|---|---|---|
| 3,704,455 | 11/1972 | Scarborough | 340/173 SP |
| 3,675,218 | 7/1972 | Sechler | 340/173 SP |
| 3,510,849 | 5/1970 | Igarashi | 340/173 R |
| 3,549,911 | 12/1970 | Scott | 340/173 R |

*Primary Examiner*—Terrell W. Fears
*Attorney*—Milton D. Bartlett, Joseph D. Pannone, Herbert W. Arnold and David M. Warren

[57] ABSTRACT

A random access memory, suitable for monolithic integrated circuit fabrication, having the ability to simultaneously write therein binary data applied thereto and read therefrom binary data previously written therein. Each bit of such binary data stored by the random access memory is stored in a binary storage cell, each such cell having independent read and write addressing circuitry. Binary data is written into selected ones of a plurality of binary storage cells by establishing in such selected cells a relative voltage polarity. Binary data is read from selected binary storage cells by sensing the relative polarity of the voltage established therein.

22 Claims, 6 Drawing Figures

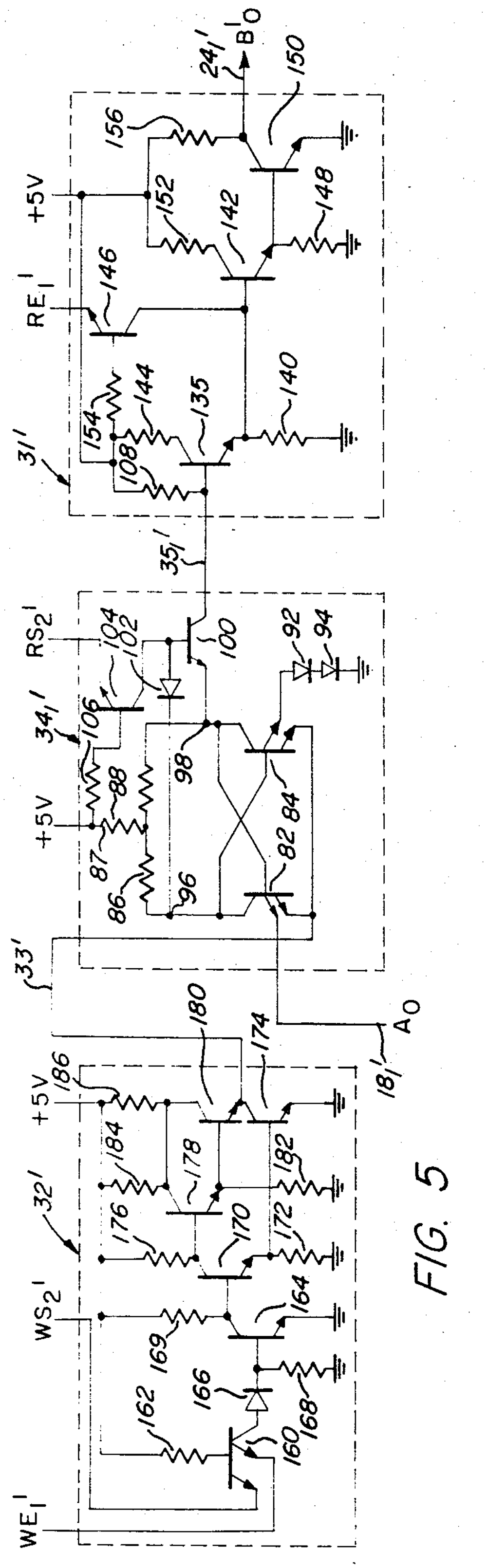
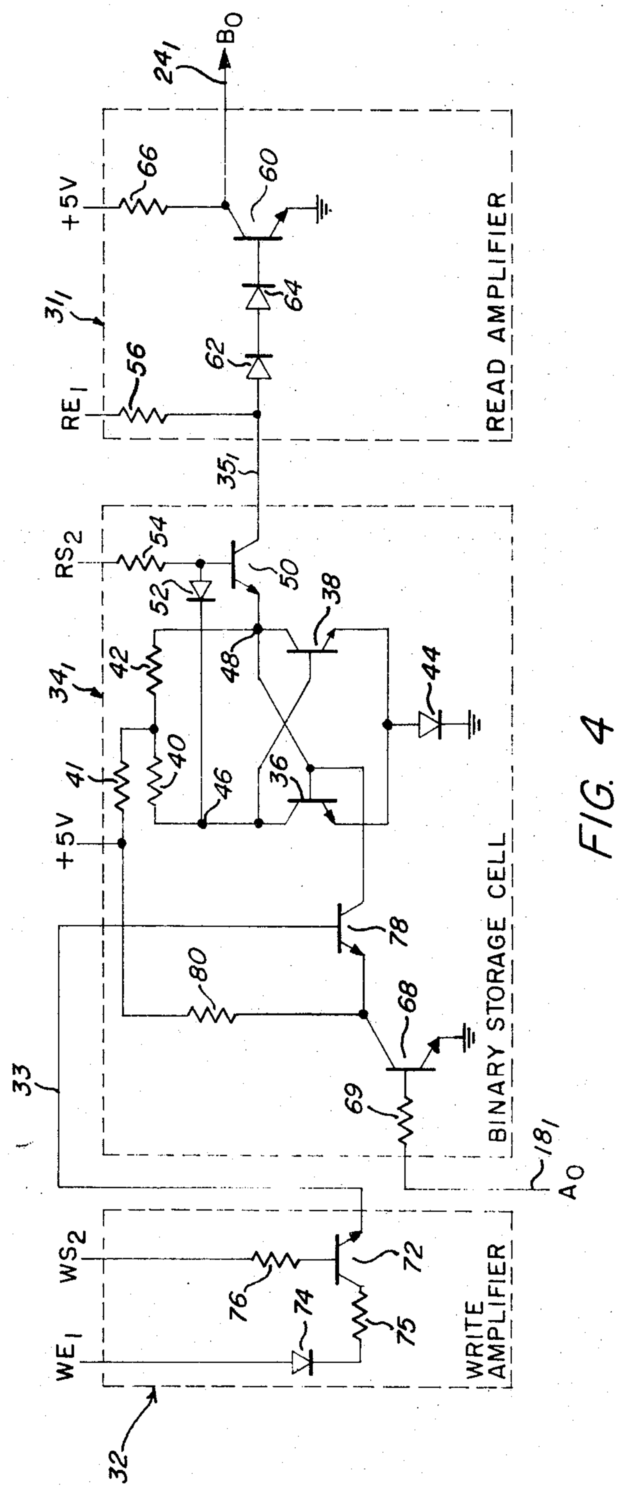
FIG. 4

Patented Sept. 25, 1973 3,761,898

3 Sheets-Sheet 3

RANDOM ACCESS MEMORY

BACKGROUND OF THE INVENTION

This invention relates generally to random access memories and more particularly to such memories suitable for monolithic integrated circuit fabrication and capable of responding to read and write address signals simultaneously applied thereto.

As is known in the art, high speed random access memories, commonly called "scratch-pad memories," are used extensively in digital computation systems. The primary function of a scratch-pad memory is to reduce the overall response time of the computation system by reducing the system's dependence on a relatively slow main memory unit for many operations. Monolithic integrated circuits, that is, those circuits employing devices such as bipolar or field effect transistors and fabricated on a single semiconductor chip, such as silicon, have been used for fabricat-ing scratch pad memories because they can be, inter alia, directly electrically coupled to other components used in the digital computation system. As is known in the art, the desirable features of a monolithic integrated circuit scratch pad memory are: (1) that circuits, designed for fabrication on a chip, have low power dissipation; (2) that the chip have a relatively high packaging density; and (3) that the scratch pad memory itself be designed to provide maximum overall speed to the entire digital computation system. The last feature is achieved to some degree by designing the scratch pad memory so that it is compatible with other electronic circuits used by such computation system, such as Transistor-Transistor-Logic (T-T-L) circuits.

Monolithic integrated circuit scratch pad memories having T-T-L compatability generally employ, for each binary storage cell, two multiple emitter transistors, each such transistor being directly coupled to the other to form a bistable multivibrator. The binary state of each bit of data to be stored in the memory is so stored therein by first placing the entire scratch pad memory in a write condition and then applying enable signals selectively to one emitter electrode of a selected transistor to thereby drive such selected transistor in a saturated or "on" condition. The binary state of a bit stored within a selected binary storage cell is read therefrom by first placing the entire scratch pad memory in a read condition and then applying signals to the emitter electrodes of both transistors of the selected binary storage cell to determine which one of the transistors is "on." This determination is made by a current sensing technique rather than a voltage detection method because it has been found that since the transistors of each binary storage cell are directly coupled, in order to reduce the power dissipation of the circuit, the voltage level between any pair of transistor electrodes in such binary storage cell, relative to ground potential, varies in magnitude a relatively small amount between the "on" and "off" state of such transistor pairs. Such voltage level magnitude variations is difficult to detect in the presence of a noise environment. Consequently, by using this current sensing technique, data are written into binary storage cells by applying signals to the same transistor junction used for reading the signal stored by such cells. Therefore, the entire scratch pad memory must be exclusively in either a read condition or a write condition for its operation. It is therefore evident that the overall speed of a digital computation system employing a scratch pad memory could be increased if such memory had the ability to write data therein simultaneously as data previously written therein is read therefrom.

SUMMARY OF THE INVENTION

It is an object of the invention to provide a digital computation system having relatively high computation speed, such system employing a random access memory capable of simultaneously writing therein binary data applied thereto and reading therefrom binary data stored therein.

It is another object of the invention to provide a high speed random access memory, suitable for high packaging density monolithic integrated circuit fabrication, having the ability to simultaneously write therein binary data applied thereto and read therefrom binary data stored therein.

It is another object of the invention to provide a simultaneous read-write random access memory suitable for high packaging density monolithic integrated circuit fabrication, the design of such circuit being compatible with other electronic circuits formed on the monolithic integrated circuit.

It is another object of the invention to provide simultaneous read-write random access memory circuitry compatible with Transistor-Transistor-Logic.

These and other objects of the invention are attained generally by providing, for use in a digital computation system, a random access memory having a plurality of binary storage cells formed on monolithic integrated circuit chips, each such binary storage cell having independent write addressing circuitry and read addressing circuitry whereby data can be written into the random access memory simultaneously as data previously written therein is read therefrom. The design of such cell and such addressing circuitry is T-T-L compatible. In particular, each such binary storage cell is comprised of a bistable element, such element assuming one of its stable states in response to a write signal and to the polarity of the voltage applied to its input terminals, such write signal being supplied by the write addressing circuitry and such polarity being dependent on the binary state of the signal to be written. The stable state assumed by such binary storage cell establishes a relative voltage polarity within such binary storage cell. The stable state of such binary storage cell is read from such cell in response to a read signal, such signal being supplied by the read addressing circuitry. Also provided are means coupled to the storage cell, responsive to the read signal, for detecting the stable state assumed by such binary storage cell, such detection being accomplished by sensing the relative polarity of the voltage established therein.

BRIEF DESCRIPTION OF THE DRAWINGS

Other objects and many of the attendant advantages of the invention will be readily appreciated as the same become better understood by reference to the following detailed description when considered in connection with the accompanying drawings wherein:

FIG. 4 shows an exemplary binary storage cell and read and write circuitry associated with such cell, such cell being representative of the circuitry fabricated on the monolithic integrated circuit chip;

FIG. 5 shows a second binary storage cell and read and write circuitry associated therewith.

DESCRIPTION OF THE PREFERRED EMBODIMENT

Figures 1, 2, 3:
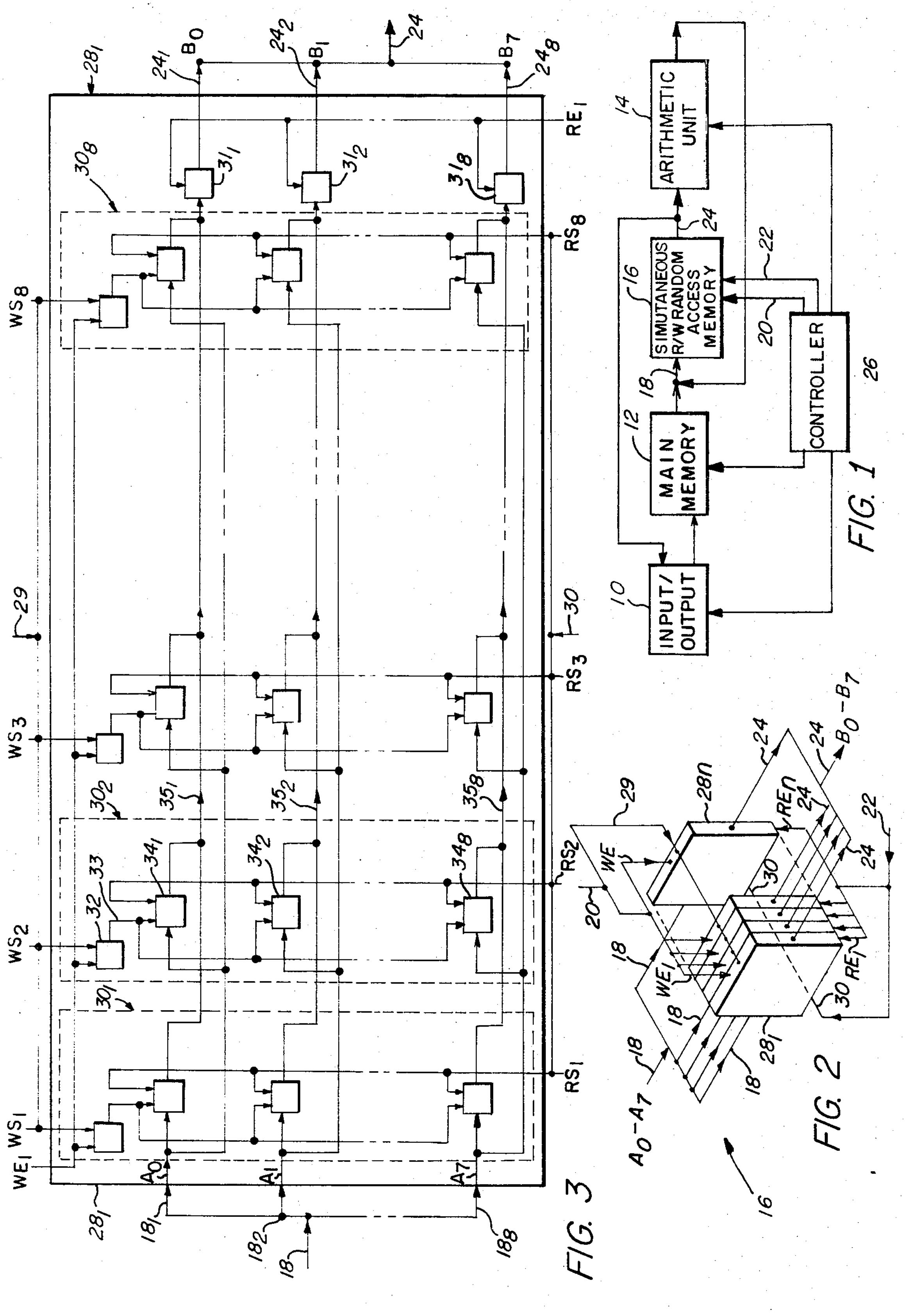
FIG. 1 shows a digital computation system employing the invention.
FIG. 2 shows a random access memory used by the digital computation system;.
FIG. 3 shows an exemplary monolithic integrated circuit chip used by the random access memory.

Referring now to FIG. 1, it should first be noted that, for convenience, a digital computer is selected to illustrate how the invention may be applied. It is also noted that positive voltage logic has been selected to illustrate the invention. In particular, a 1 signal is a voltage +3.5 to +5.0 volts and a 0 signal is a voltage +0.3 volts, such voltages being measured relative to a ground potential. Thus, the illustrated computer includes: (1) An input/output device 10, such device being of any conventional design, here an electric typewriter; (2) a main memory, 12, such memory having relatively large storage capacity and relatively slow access time, here a core memory; (3) an arithmetic unit of any conventional design; (4) a simultaneous read/write random access memory, 16, such memory having relatively high speed and relatively fast access time, the design of which will be described in detail later; however, it is to be noted in passing that such random access memory has the capability of simultaneously writing therein binary signals on line 18, such signals being written in response to write address signals applied to line 20, and reading from such memory binary signals stored therein, in response to read address signals applied to line 22, such read binary signals appearing on line 24; and (5) a controller 26, here of any conventional design except that such controller has the capability of applying write address and read address signals simultaneously to lines 20 and 22 respectively. It is here noted in passing that, for reasons to become apparent, line 18 here is a cable carrying lines $18_1$–$18_8$; line 20 here is a cable carrying lines $WE_1$–$WE_n$ and line 29; line 22 here is a cable carrying lines $RE_1$–$RE_n$ and line 30; and, line 24 here is a cable carrying lines $24_1$–$24_8$ (such lines being shown in FIG. 2.) Information flows within the digital computer in response to signals transmitted by the controller 26 in a conventional manner, that is, data from input/output device 10 are stored in main memory 12, such stored data being available for processing by arithmetic unit 14. Arithmetic unit 14 also uses, periodically, random access memory 16, such use being controlled by controller 26. Data processed by the computer is retrieved therefrom, in a conventional manner, by input/output device 10. It is here noted that, for reasons to become apparent, because simultaneous read/write random access memory 16 is not required to operate exclusively in a read or write condition, arithmetic unit 14 is capable of functioning continuously. That is, arithmetic unit 14 is able to retrieve data previously stored in simultaneous read/write random access memory 16, simultaneously as such random access memory is updated with data concurrently being written therein from main memory 12.

Referring now to FIG. 2, it is first noted that random access memory 16, here being designed for parallel operation, is comprised of a plurality of monolithic integrated circuit chips, $28_1$–$28_n$. A binary word, here 8 bits in length, ($A_0$–$A_7$), applied to line 18 is written into random access memory 16 when write address signals are applied to line 20. It is here noted in passing that bits $A_0$–$A_7$ are applied respectively to lines $18_1$–$18_8$ (not shown) and that all such lines are connected to all integrated circuit chips, $28_1$–$28_n$, in a conventional manner. The write address signals on line 20 are comprised of binary signals on: (1) lines $WE_1$–$WE_n$, each one of such lines being connected to a separate one of integrated circuit chips $28_1$–$28_n$ respectively (as shown); and, (2) line 29 (such line here being a cable carrying lines $WS_1$–$WS_8$, not shown). It is here noted in passing that line 29 (and therefore lines $WS_1$–$WS_8$, not shown) is connected to all integrated circuit chips, (i.e. $28_1$ through $28_n$) in a manner to be described. As will become clear, signals applied to lines $WE_1$–$WE_n$ select the integrated circuit chip wherein binary word $A_0$–$A_7$ is to be written and lines $WS_1$–$WS_8$ select the binary storage cells (not shown) fabricated on such selected chip wherein each bit of such binary word is to be written. Likewise, data is read from random access memory 16 when read address signals are applied to line 22, such read data appearing as binary word $B_0$–$B_7$ on line 24. It is here noted in passing that line 24 (as well as lines $24_1$–$24_8$, not shown) are connected to all integrated circuit chips $28_1$–$28_n$ in a conventional manner. The read address signals on line 22 are comprised of binary signals on: (1) lines $RE_1$–$RE_n$, each one of such lines being connected to each one of integrated circuit chips $28_1$–$28_n$ respectively (as shown); and, (2) line 30, (such line here being a cable carrying lines $RS_1$–$RS_8$, not shown). Line 30 is connected to all integrated circuit chips (i.e. $28_1$ through $28_n$) in a manner to be described. As will become clear, signals applied to lines $RE_1$–$RE_n$ select the integrated circuit chip wherefrom binary word $B_0$–$B_7$ is to be read and lines $RS_1$–$RS_8$ select the binary storage cells (not shown) fabricated on such selected chip wherefrom each bit of such binary word is to be read. It is here noted that each integrated chip $28_1$–$28_n$ is identical except that each such chip has a unique "WE" line (i.e. $WE_1$–$WE_n$) and a unique "RE" line (i.e. $RE_1$–$RE_n$), such lines being used, as previously pointed out, to select the integrated circuit chip to which a binary word is to be written and from which a binary word is to be read, respectively.

Therefore, referring also to FIG. 3, such FIG. shows an exemplary monolithic integrated circuit chip for discussion, here integrated circuit chip $28_1$. Integrated chip $28_1$ is selected for writing data therein by applying to random access memory 16 a 1 to line $WE_1$ and 0 to lines $WE_2$–$WE_n$ and selected for having read data therefrom by applying a 1 to line $RE_1$ and 0 to lines $RE_2$–$RE_n$ of such memory. It is first noted that monolithic integrated circuit chip $28_1$ is comprised of a plurality, here 8, of identical word storage stages $30_1$–$30_8$, and a plurality of identical read amplifiers numbered $31_1$–$31_8$. Word storage stages $30_1$–$30_8$ are connected, respectively. to lines $WS_1$–$WS_8$ and lines $RS_1$–$RS_8$, as shown. All such stages are connected to line $WE_1$ (as shown). Line $RE_1$ is connected to all read amplifiers $31_1$–$31_8$ of integrated circuit chip $28_1$. Exemplary word storage stage, here $30_2$, will be discussed. Such word storage stage includes a write amplifier 32, such amplifier being connected to line $WE_1$, line $WS_2$ and, via line 33, to a plurality, here 8, of identical binary storage cells, $34_1$–$34_8$ as shown. Binary storage cells $34_1$–$34_8$ are connected, respectively, both to lines $18_1$–$18_8$ and lines $35_1$–$35_8$ as shown. Binary storage cells $34_1$–$34_8$ are connected to line $RS_2$, as shown. Lines $35_1$–$35_8$ are connected, respectively, to read amplifier $31_1$–$31_8$ as shown. For reasons to become apparent, if word $A_0$–$A_7$ is to be written into an exemplary stage, here say stage $30_2$, a 0 is applied to lines $WS_1$ and lines $WS_3$–$WS_8$, whereas a 1 is applied to line $WS_2$. Each bit associated with $A_0$–$A_7$ becomes stored in binary storage cells $34_1$–$34_8$, respectively. In reading a word $B_0$–$B_7$ from an exemplary storage stage, here say $30_2$, a 1 is applied to line $RS_2$ as a word is read from any selected word storage stage of such memory. 0 is applied to lines $RS_1$ and lines $RS_3$–$RS_8$. The bits, $B_0$–$B_7$, stored in binary storage cells $34_1$–$34_8$ are read by means of amplifiers $31_1$–$31_8$ respectively. The read word, $B_0$–$B_7$, appears as binary signals on lines $24_1$–$24_8$, respectively. It is noted that, for reasons to become apparent, a word can be written into any selected word storage stage of random access memory 16 simultaneously as a word is read from any selected word storage stage of such memory. In fact, a word can be simultaneously written into and read from the same word storage stage. The word storage stage selection is made by means of lines $WE_1$–$WE_n$, $WS_1$–$WS_8$, $RE_1$–$RE_n$, and $RS_1$–$RS_8$, in the manner described.

Referring now also to FIG. 4, an exemplary write amplifier, here 32, binary storage cell, here $34_1$, and read amplifier, here $31_1$, are shown in their respective detailed circuitry. It is here noted that, for reasons to become apparent, all transistors used herein have the property that when any one such transistor is in saturation, (that is, "on"), the voltage between the emitter electrode and base electrode of such "on" transistor is approximately 0.7 volts, and the voltage between the emitter electrode and collector electrode of such "on" transistor is approximately 0.3 volts. It is also noted that when a diode is forward biased the voltage drop developed across such diode is approximately 0.7 volts. As is known in the art, such characteristics are typical of conventional switching transistors and diodes.

Binary storage cell $34_1$ includes a transistor 36 and a transistor 38, each such transistors being interconnected as shown to form a direct coupled bistable multivibrator. The collector electrode of each such transistor is connected to terminals 46 and 48, as shown, and also to a suitable power supply, here +5 volts, (not shown) through resistors 40, 41 and 42 as shown. The emitter electrode of each such transistors is connected to ground potential through a diode 44 as shown. As is known, a bistable multivibrator has the property that, in one of its two stable conditions, one transistor is in a saturation condition, that is "on," and the other transistor is in a cutoff condition, that is "off." Therefore, as is well known, binary data can be stored by the bistable multivibrator. In particular, when one transistor is "on," here say transistor 38, a 1 is said to be stored in binary storage cell $34_1$, whereas when the other transistor is "on," here say 6, a 0 is said to be stored in such storage cell. It is here noted that, in a stable condition, the voltage between terminals 46 and 48 (i.e. $V_{46}$–$V_{48}$) will be approximately ± 0.4 volts. The polarity of such voltage will depend on whether a 1 or a 0 has been stored in the binary storage cell. In particular, when a 1 is stored in the storage cell $34_1$, the relative polarity of the voltage between terminal 46 and terminal 48 is positive (i.e. $V_{46}$–$V_{48}$ = +.4 volts), whereas when a 0 is stored therein the relative polarity of such voltage is negative (i.e. $V_{46}$–$V_{48}$ = –.4 volts). The relative polarity of the voltage between terminal 46 and terminal 48 is detected by means of, inter alia, transistor 50, diode 52 and a resistor 54. Transistor 50 has its emitter electrode connected to terminal 48; its base electrode connected to both terminal 46, through diode 52, as shown, and also to line $RS_2$ through resistor 54, as shown; and, its collector electrode connected, inter alia, to line $RE_1$, through resistor 46 via line $35_1$. In operation, when the relative polarity of the voltage established between terminal 46 and terminal 48 is positive, that is a 1 is stored in binary storage cell $34_1$, and when a 1 is applied to both lines $RS_2$ and $RE_1$, that is, binary storage cell $34_1$ is selected for reading, transistor 50 will be driven essentially into saturation, whereby the diode 52 electrically disconnects terminal 46 from the base electrode of such transistor and line $35_1$ has applied thereto +1.3 volts (or less). Conversely, when the relative polarity of the voltage established between terminal 46 and terminal 48 is negative, that is a 0 is stored in binary storage cell $34_1$, and when a 1 is applied to both lines $RS_2$ and $RE_1$, transistor 50 will be cut off. Therefore, the voltage on line $35_1$ will tend towards +5 volts; however, the voltage on such line will be, for reasons to become apparent, limited to +2.1 volts.

Read amplifier $31_1$ is comprised of transistor 60, such transistor having its emitter electrode connected to ground potential; its base electrode connected both to line $35_1$, through diodes 62 and 64, as shown, and also to line $RE_1$ through such diodes and resistor 56, as shown; and its collector electrode connected both to a suitable power supply, here +5 volts, not shown, and to line $24_1$, as shown. In operation, when the voltage on line $35_1$is +1.3 volts or less (that is, when the relative polarity between terminals 46 and 48 is positive [i.e. binary storage cell $34_1$ has a 1 stored therein]) such voltage is incapable of driving transistor 60 "on," (i.e. because the voltage drop across diodes 62 and 64 would limit the base-emitter junction voltage of transistor 60 to less than +.7 volts) and therefore the signal on line $24_1$ is 1; whereas, when transistor 50 is cut off (that is, when the relative voltage between terminals 46 and 48 is negative [i.e. binary storage cell $34_1$ has a 0 stored therein]), transistor 60 is driven "on" by the 1 signal on line $RE_1$, the voltage on line $35_1$ is limited to +2.1 volts, and therefore the signal on line $24_1$ is 0. It is here noted that when a 0 signal is applied to line $RE_1$ the signal on line $24_1$ is also 1,; however, because all read amplifiers $31_1$ of all integrated circuit chips $28_1$–$28_n$ are wired in an "OR" configuration the signal on line $24_1$ is, in effect, controlled by the binary storage cell selected for reading. That is, if a read selected binary storage cell has a 0 read therefrom, the signal on line $24_1$ is 0.

The binary state of the signal $A_0$ applied to line $18_1$ is written into binary storage cell $34_1$ only when a 1 is applied to both lines $WE_1$ and $WS_2$. Binary storage cell $34_1$ is connected to write amplifier 32 by line 33, as shown. In "write" operation, if signal $A_0$ is 1, such signal being coupled to transistor 68 by resistor 69, transistor 68 will go "on" and its collector electrode will become +.3 volts. Because a 1 is applied to lines $WE_1$ and $WS_2$, transistor 72 will turn "on" and therefore current of sufficient level will flow through diode 74, resistor 75 and resistor 76 to drive transistor 78 "on." Therefore, the voltage on the collector electrode of transistor 78 will be +.6 volts, and because collector electrode of transistor 78 is connected to the base electrode of transistor 36, the voltage on the base electrode of transistor 36 will be clamped to +.6 volts. Therefore, because the voltage on emitter electrode of transistors 36 and 38 is clamped to 0.7 volts by diode 44, the +.6 volts applied to the base electrode of transistor 36 will be insufficient to turn transistor 36 "on" (because such transistor requires 0.7 volts (or more) across its case-emitter junction). Consequently, transistor 38 must turn "on," and the voltage polarity between terminals 46 and 48 will be positive (i.e., a 1 is stored in binary storage cell $34_1$). Conversely, if signal $A_0$ is 0, transistor 68 cannot turn "on." However, the collector-base junction of transistor 78 is forward-biased when a 1 is applied to lines $WE_1$ and $WS_2$ and the base electrode of transistor 36 will have applied thereto +1.4 volts because such transistor must turn "on." Consequently, the voltage polarity between terminal 46 and terminal 48 will be negative (i.e., a 0 becomes stored in binary storage cell $34_1$). A little thought will make it clear that the bistable multivibrator is responding to the relative polarity of the voltage between the base electrode of transistor 36 and the emitter electrodes of transistors 36 and 38. In particular, if such relative polarity is negative a 1 is stored in binary storage cell $34_1$, whereas if such polarity is positive a 0 is stored therein. (It is here noted that if, in the above illustration, $WE_1$ had a 0 applied to it instead of a 1, resistor 76 and transistor 72 are of such design that insufficient current would flow to the base electrode of transistor 78 to maintain such latter transistor in saturation. Therefore, under such condition this signal on line $18_1$ would not be electrically coupled to transistor 36.)

FIG. 5 shows an exemplary binary storage cell, here $34_1'$, write amplifier, here $32'$ and read amplifier, here $31_1'$. Binary storage cell $34_1'$ includes a transistor 82 and a transistor 84, both double emitter transistors, interconnected to form a direct coupled bistable multivibrator as shown. The collector electrode of each such transistor is connected to a suitable power supply, here +5 volts, (not shown) through resistors 86, 87 and 88, as shown. A first emitter electrode of each transistor is connected in common and to write amplifier $32'$ via line $33'$, as shown. A second emitter electrode of transistor 82 is connected to line $18_1'$, whereas a second emitter electrode of transistor 84 is connected to ground potential through diodes 92 and 94, as shown. The bistable characteristic of the coupled transistors 82 and 84 is such that when one transistor is "on," here say 82, a 0 is said to be stored in binary storage cell $34'$, whereas when the other transistor is "on," here say 84, a 1 is said to be stored in such cell. A little thought will make it obvious that when a 1 is stored in such cell, the relative polarity of the potential between terminal 96 and terminal 98 is positive (i.e. $V_{96}-V_{98} = +.4$ volts), whereas when a 0 is stored therein the relative polarity is negative. The relative polarity of such voltage established in binary storage cell $34_1'$ is detected by means of, inter alia, transistor 100, diode 102, transistor 104 and resistor 106. Transistor 100 has its emitter electrode connected to terminal 98; its base electrode connected both to terminal 96 through diode 102 and to the collector electrode of transistor 104, as shown; and, its collector electrode connected to line $35_1'$. It is to be noted here in passing the line $35_1'$ is connected, inter alia, to a suitable power supply, here +5 volts, (not shown) through resistor 108. Transistor 104 has its base electrode connected to the +5 volt power supply, not shown, through resistor 106, as shown; and, its emitter electrode connected to line $RS_2'$. In operation, when the relative polarity of the voltage between terminals 96 and 98 is positive, that is a 1 is stored in binary storage cell $34_1'$, and when a 1 is applied to line $RS_2'$, transistor 100 is driven "on" by current flowing into the base electrode of such transistor from the +5 volt power supply, not shown, through both resistor 106 and the base-collector junction of transistor 104. Therefore, line $35_1'$ has applied thereto +.9 volts (or less). It is noted in passing that, for reasons to become apparent, the voltage on line $35_1'$ can go to +2.0 volts when binary stage cell $34_1'$ is simultaneously selected for writing data therein. Conversely, when the relative polarity between terminals 96 and 98 is negative, that is a 0 is stored in binary storage cell $34_1'$, transistor 100 is "off" and the voltage on line $35_1'$ tends toward +5 volts, but, for reasons to become apparent, is limited to +2.1 volts.

Read amplifier $31_1'$ includes a transistor 135, such transistor having its base electrode connected both to line $35_1'$ and the +5 volt power supply, not shown, through resistor 108, as shown; its emitter electrode connected to both ground potential through resistor 140 and the base electrode of transistor 142; and, its collector electrode connected to the +5 volt power supply (not shown) through resistor 144. Transistor 142 has its base electrode connected to the collector electrode of transistor 146; its emitter electrode connected both to ground potential through resistor 148 and to the base electrode of transistor 150; and, its collector electrode connected to the +5 volt power supply, not shown, through resistor 152. Transistor 146 has its base electrode connected to the +5 volt power supply, not shown, through resistor 154 and its emitter electrode connected to line $RE_1'$. Transistor 150 has its emitter electrode connected to ground potential and its collector electrode connected both to line $24_1'$ and the +5 volt power supply through resistor 156. In operation, when the signal on line $RE_1'$ is a 0, transistor 146 is "on" and therefore transistors 142 and 150 are "off." Consequently, the signal on line $24_1'$ is independent of the signal on line $35_1'$. When the signal applied to line $RE_1'$ is 1, transistor 146 is "off" and therefore the signal on line $24_1$ is dependent on the signal on line $35_1'$. In particular: (1) when transistor 100 is "off" because the relative polarity of the voltage established between terminals 96 and 98 is negative, or because $RS_2'$ is 0, transistors 135, 142 and 150 will be +on" and line $24_1'$ will have applied thereto a 0 (and the voltage on line $35_1'$ will limit to +2.1 volts); and (2), when transistor 100 is "on" because the relative polarity of the voltage established between terminals 96 and 98 is positive and when $RS_2'$ is 1, transistors 135, 142 and 150 will be "off" (because the insufficient level of the voltage on line $35_1'$ [i.e. less than +2.1 volts] cannot turn transistor 150 "on") and the signal applied to line $24_1'$ will be 1 (if, for reasons discussed in reference to binary storage cell $34_1$ in FIG. 4, no other storage cell has applied thereto a read address signal).

The binary state of the signal applied to line $18_1'$ is written into binary storage cell $34_1'$ when a 1 is applied to both lines $WE_1'$ and $WS_2'$, whereas when a 0 is applied to either line $WE_1'$ or line $WS_2'$ or both lines $WE_1'$ and $WS_2'$ the binary state of such signal is not written into such binary storage cell. The details of write amplifier 32′ will be discussed later; suffice it to say here that when a 1 is applied to both $WE_1'$ and $WS_2'$, line 33′ has applied thereto +3.6 volts, whereas if a 0 is applied to line $WE_1'$ or line $WS_2'$ or both lines $WE_1'$, $WS_2'$, line 33′ has applied thereto a voltage of +.3 volts. Therefore, in operation, when either line $WE_1'$ or line $WS_2'$ or both lines $WE_1'$ and $WS_2'$ have 0 signals applied thereto (i.e. line 33′ has +.3 volts thereon), binary storage cell 34′ will not respond to the binary state of the signal applied to line $18_1'$ because the voltage on the emitter of the "on" transistor (82 or 84) will be +.3 volts. That is, the signal on line $18_1$ cannot change the stable state of the bistable multivibrator. However, when a 1 is applied to both $WE_1'$ and $WS_2'$ line 33′ has applied thereto a voltage, here +3.6 volts, therefore: (1) if a 0 is applied to line $18_1'$ transistor 82 will turn "on" if previously "off" (because an amitter of such transistor will be at +.3 volts whereas both emitters of transistor 84 have been limited to a minimum of +1.4 volts by diodes 92 and 94 and the signal on line 33′) or transistor 82 will remain "on" if previously "on"' and, (2) if a 1 is applied to line $18_1'$, transistor 82 will turn "off" and transistor 84 will turn "on," (because: (*a*), such latter transistor has both emitter electrodes limited to +1.4 volts by diodes 92 and 94; and, (*b*), the 1 signal on line 18′ is greater than +1.4 volts).

A little thought will make it apparent that binary storage cell $34_1'$ responds to the signal applied to one emitter electrode of transistor 82. In particular, such cell is responding to the relative polarity of the voltage between the emitter electrode of transistor 82 connected to line $18_1'$ and the emitter electrode of transistor 84 connected to diodes 92 and 94. That is, when the voltage polarity is positive a 0 is stored by binary storage cell $34_1'$, whereas when such polarity is negative, a 1 is stored therein.

Now referring in detail to the design of write amplifier 32′, it is noted that: (1) such amplifier is functionally equivalent to an AND gate (i.e. when lines $WE_1'$ and $WS_2'$ have a 1 applied thereto, line 33′ has applied thereto a relatively high voltage, here +3.6 volts, whereas when either line $WE_1'$ or line $WS_2'$ or both lines $WE_1'$ and $WS_2'$ have 0 applied thereto, line 33′ has applied thereto a relatively low voltage, here +.3 volts); and, (2) such amplifier is designed to provide sufficient current to drive all binary storage cells comprising a word storage stage, here $30_2$(as shown in FIG. 3). The base electrode of transistor 160 is connected to a suitable power supply, here +5 volts, not shown, through resistor 162, as shown; and the collector electrode of such transistor is connected to the base electrode of transistor 164 through diode 166, as shown. Transistor 164 has its base electrode connected to ground through resistor 168, as shown; its emitter electrode connected to ground, as shown; and, its collector electrode connected both to the +5 volt power supply, not shown, through resistor 69, as shown; and the base electrode of transistor 170. Transistor 170 has its emitter electrode connected both to ground potential through resistor 172 and to the base electrode of transistor 174, and its collector electrode connected to: (*a*) the +5 volt power supply, not shown, through resistor 176; and (*b*) to the base electrode of transistor 178. Transistor 174 has its emitter electrode connected to ground potential and its collector electrode connected both to the emitter electrode of transistor 180 and line 33′. Transistor 178 has its emitter electrode connected to ground potential through resistor 182, as shown, and its collector electrode connected both to the +5 volt power supply, not shown, through resistor 184, as shown, and to the collector electrode of transistor 180, as shown. Transistor 180 has its collector electrode connected to the +5 volt power supply, not shown, through resistor 186, as shown. In operation, when either line $WE_1'$ or line $WS_2'$ or both lines $WE_1'$ and $WE_2'$ have applied thereto a 0, the base electrode of transistor 164 will not have sufficient voltage developed therein to turn such transistor "on." Therefore, transistors 170 and 174 will be "on," because of the +5 volt power supply through resistor 169 and the voltage on line 33′ will be +0.3 volts. Conversely, when both lines $WE_1'$ and $WS_2'$ have applied thereto a 1, transistor 160 will have its base collector junction forward biased and therefore transistor 164 will have sufficient voltage on its base electrode to turn such transistor "on." When transistor 164 is "on" transistor 170 is "off" and therefore transistor 174 is "off," however, transistors 178 and 180 are "on." Consequently, the voltage on line 33′ will be +3.6 volts when conven-tional pull up effects reach steady state, and binary storage cell $34_1'$ will "write" therein the binary signal applied to line $18_1'$.

Figure 6:
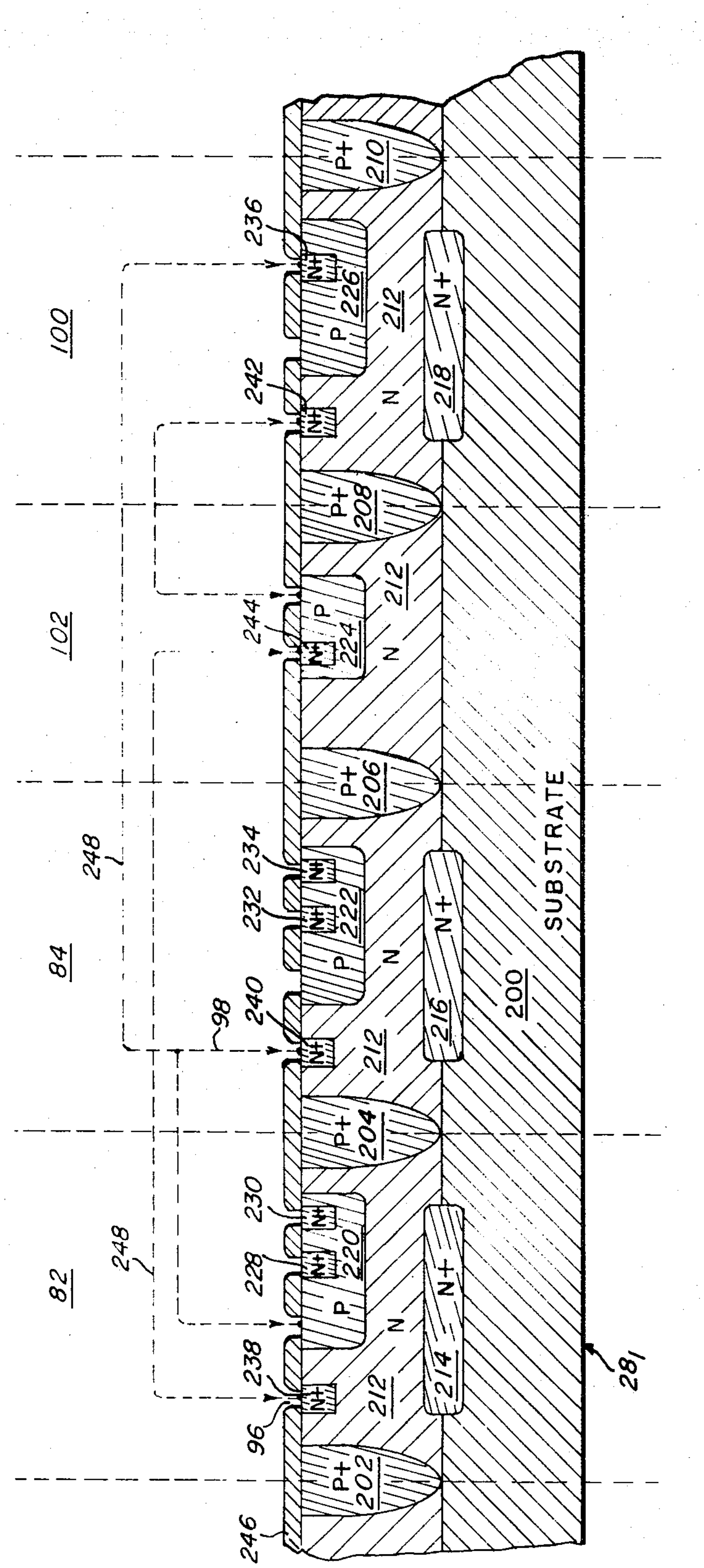
FIG. 6 shows a portion of a monolithic integrated circuit chip, somewhat distorted in size, such chip having formed therein a portion of the second binary storage cell.

Referring now also to FIG. 6, a portion of monolithic integrated circuit chip $28_1$ is shown, such chip having formed therein transistors 82, 84 and 100 and diode 102 of binary storage cell $34_1'$. As shown, such chip includes: A substrate 200, here of silicon; isolation regions 202, 204, 206, 208 and 210 for isolating transistors 82, 84 and 100 and diode 102, such isolation regions here being of $P^+$ material; an epitaxial region, 212, of N material; $N^+$ diffusion regions 214, 216 and 218, such regions being of $N^+$ material, for forming the subcollector of transistors 82, 84 and 100; P duffusion regions 220–226, such regions being of P material to form the base electrodes of transistor 82, the base electrode of transistor 84, the cathode of diode 102 and the base electrode of transistor 100, respectively; $N^+$ diffusion regions 228–236, such regions being of $N^+$ material to form the emitter electrodes of transistor 82, the emitter electrodes of transistor 84, and the emitter electrode of transistor 100, respectively; $N^+$ diffusion regions 238-242, such regions being used to form the collector electrodes of such transistors; and N region 244, such region being used to form the anode of diode 102. It is noted that conventional metalization for connecting such transistors and diode are not shown; however, insulation layers of $S_iO_2$ are shown and indicated by numeral 246. Therefore, with such metalization, the base electrode of transistor 82 would be connected to both the collector electrode of transistor 84 and the emitter electrode of transistor 100. Also, the base electrode of transistor 82 would be connected both to the collector electrode of transistor 84 and the cathode of diode 102. Also, the anode of diode 102 would be connected to the base electrode of transistor 100. These "connections" are indicated by dotted lines 248, as shown. Such monolithic integrated circuit chip can be fabricated using conventional methods, such as those described in Thin Film Technology by Robert W. Berry, Peter M. Hall and Murray T. Harris, Van Nostrand Reinhold, New York, 1968.

From the foregoing description it will be apparent to one skilled in the art that the concepts presented may be implemented in various ways. For example, the simultanous read/write random access memory 16 may be organized for serial operation instead of the parallel operation described by using conventional "X," "Y" crossbar selection for both the write address signals and the read address signals, i.e., "X," "Y" select being "WE," "WS" and "RE," "RS"). Also, the complement of the signal stored in a binary storage cell can be read by reversing the connections of transistor 100, diode 102 to terminals 96 and 98 and of transistor 50, diode 52 to terminal 46 and 48. Also, the circuits shown in FIG. 5 can be made to be compatible with T-T-L logic (i.e. a 1 signal being a voltage greater than +1.4 volts and a 0 signal being less than +1.4 volts) by passing the signals on exemplary line $18_1'$ through a conventional T-T-L inverter circuit to convert the T-T-L signals (1, > 1.4 volts − 0, < 1.4 volts) to the 1, − 0, logic described in reference to FIGS. 1–6.

Therefore, while the invention has been particularly shown and described with reference to the preferred embodiments thereof, it would be understood by those skilled in the art that various changes in form and details may be made therein without departing from the spirit and scope of the invention.

What is claimed is:

1. In combination:

a. means for developing a write signal;

b. means, connected to the write signal developing means, for storing a binary signal in response to the write signal;

c. means, connected to the storing means, for reading the binary signal stored in the storing means in response to a read signal, such reading means being connected to the storing means independently of the write signal developing means; and, d. a crystal body having a plurality of semi-conductor devices, the write signal developing means, the storing means and the reading means being integrated with the crystal body.

2. The combination recited in claim 1, wherein: the storing means is comprised of a bistable element, such bistable element storing the binary signal as a relative voltage polarity; and the reading means reads the binary signal stored by the storing means by detecting the relative voltage polarity.

3. The combination recited in claim 2 wherein the bistable element is comprised of: a first and second transistor, each such transistor having a first and second electrode, the first electrode of the first transistor being connected to the second electrode of the second transistor, the first electrode of the second transistor being connected to the second electrode of the first transistor.

4. The combination recited in claim 3 wherein the write signal developing means is in circuit with at least one electrode of the first transistor.

5. The combination recited in claim 4 wherein the first transistor includes a third electrode and the write signal developing means is in circuit with the first electrode of the first transistor and the third electrode of the first transistor.

6. The combination recited in claim 2 wherein the bistable element is comprised of a pair of active semiconductor elements and the reading means is connected between such a pair of active semiconductor elements.

7. The combination recited in claim 3 wherein the reading means is connected to the first electrode of the first transistor and the second electrode of the first transistor.

8. The combination recited in claim 3 wherein the reading means includes a third transistor, such third transistor having at least two electrodes, one such electrode being in circuit with one electrode of the first transistor and the second electrode of the third transistor being in circuit with another electrode of the first transistor.

9. The combination recited in claim 3 wherein: the first transistor includes a third and fourth electrode and the second transistor includes a third electrode, such third electrode of the first and second transistors being connected one to the other; the write signal developing means being coupled to the third electrode; and, the binary signal being connected to the fourth electrode.

10. The combination recited in claim 9 wherein: the second transistor includes a fourth electrode; and, including means, connected to the fourth electrode of the second transistor, for providing a reference voltage on the fourth electrode of the second transistor.

11. In combination:

a. a data storage element;

b. means for coupling the data storage element to a write address signal source;

c. means for coupling the data storage element to a read address signal source, such latter coupling means being connected to the data storage element independently of the former coupling means; and d. a crystal body having a plurality of semiconductor devices, the data storage element, the write address signal source coupling means, and the read address signal source coupling means being integrated with the coupling means being integrated with the crystal body.

12. The combination recited in claim 11 wherein the data storage element is comprised of a pair of transistors, the base electrode and the collector electrode of one of the pair of transistors being connected respectively to the collector electrode and the base electrode of the other one of the pair of transistors.

13. The combination recited in claim 12 wherein the read addressing signal source coupling means is coupled to the base electrode and the collector electrode of one of the pair of transistors.

14. In combination:

a. a plurality of data storage elements, such elements being adapted to have data applied thereto, a group of selected ones thereof storing data applied thereto in response to a write addressing signal applied to each one of the data storage elements of the group;

b. a plurality of reading means, each one thereof being coupled to a different one of the plurality of data storage elements and being responsive to a read addressing signal applied to each one of a group of selected ones of the reading means, such reading means being connected to the storage element independently of the write addressing signal, for sensing the data stored in the data storage elements coupled thereto in response to the read addressing signal; and c. a crystal body having a plurality of semiconductor devices, the plurality of storage means and the plurality of reading means being integrated with the crystal body.

15. The combination recited in claim 14 wherein each one of the plurality of data storage elements is comprised of a pair of transistors, the base electrode and the collector electrode of one of the pair of transistors being directly connected respectively to the collector electrode and the base electrode of the other one of such pair of transistors.

16. The combination recited in claim 15 wherein each one of the plurality of reading means is coupled to the base electrode and the collector electrode of one of the pair of transistors.

17. In combination:

a. a plurality of data storage elements;

b. means for applying data to be stored in each one of such plurality of data storage elements;

c. writing means for enabling selected ones of such data storage elements to store data applied thereto;

a plurality of reading means, each one thereof being coupled to a different one of the plurality of data storage elements, for sensing the data stored in selected ones of the plurality of storage elements, such reading means being connected to the storage element independently of the writing means; and e. a crystal body having a plurality of semiconductor devices, the plurality of data storage elements, the data applying means, the writing means and the reading means being integrated with the crystal body.

18. The combination recited in claim 17 wherein each one of the plurality of data storage elements is comprised of a pair of transistors, the base electrode and the collector electrode of such pair of transistors being directly connected respectively to the collector electrode and the base electrode of the other one of such pair of transistors.

19. The combination recited in claim 18 wherein each one of the plurality of reading means is coupled to the base electrode and the collector electrode of one of the pair of transistors of the data storage element coupled to such one of the reading means.

20. A storage cell comprising:

a. a means for receiving a binary signal;

b. a directly coupled bistable multivibrator connected to the receiving means;

c. write enable means for coupling the directly coupled bistable multivibrator to a write enable signal and for enabling the binary signal on the receiving means to be stored in such multivibrator in response to the write enable signal;

d. sensing means, operative independently of the write enable means and responsive to a read enable signal, for sensing the binary signal stored in such multivibrator in response to the read enable signal;

e. a data output means for receiving the binary signal sensed in the multivibrator in response to the read enable signal; and f. a crystal body having a plurality of semiconductor devices, the receiving means, the directly coupled bistable multi-vibrator, the write enable means, the sensing means and the data output means being integrated with the crystal body.

21. In combination:

a. a plurality of storage means arranged in a matrix, each one thereof including:

i. a data input means for receiving a binary signal;

ii. write means for coupling the storage means to a write signal, and for enabling the binary signal on the data input means to be stored in the storage means in response to such write enable signal;

iii. sensing means, operative independently of the write enable means and responsive to a read signal, for sensing the binary signal stored in the storage means in response to such read signal;

b. means for applying a write signal to selected ones of the write means;

c. means for applying a read signal to selected ones of the sensing means; and d. a crystal body having a plurality of semiconductor devices, the plurality of storage means, the write signal applying means and the read signal applying means being integrated with the crystal body.

22. A storage cell comprising:

a. a first and second transistor arranged as a bistable multivibrator, each one of such transistors having a data emitter electrode a write enable emitter electrode, a base electrode and a collector electrode, the base electrode and collector electrode of one of such transistors being directly connected to the collector electrode and base electrode of the other one of such transistors, respectively;

b. a voltage reference means connected to the data emitter electrode of the first transistor;

c. a data line connected to the data emitter electrode of the second transistor;

d. a write enable line connected to the write enable emitter electrode of the first and the second transistor;

e. a reading means connected to the collector electrode of the first and the second transistor, such reading means including:

i. a diode means; and, ii. a transistor, such transistor having its emitter electrode connected to the collector electrode of the first transistor and a base electrode connected to:

1. a read enable line; and 2. the collector electrode of the second transistor through the diode means.

* * * * *

UNITED STATES PATENT OFFICE
CERTIFICATE OF CORRECTION

Patent No. 3,761,898 Dated September 25, 1973

Inventor(s) Henry C. Pao

It is certified that error appears in the above-identified patent and that said Letters Patent are hereby corrected as shown below:

In the Specification

Column 1, line 19, change "fabricat-ing" to --fabricating--.

Column 8, line 52, change "+on" to --"on"--.

Column 10, line 24, change "conven-tional" to --conventional--.

In the Drawing

Fig. 1, box 16, "Simutaneous" should be -Simultaneous-

Signed and Sealed this

*sixteenth* Day of *September 1975*

[SEAL]

*Attest:*

RUTH C. MASON
*Attesting Officer*

C. MARSHALL DANN
*Commissioner of Patents and Trademarks*